June 5, 1934.                 W. D. ARCHEA                  1,961,125
                BACK LASH ELIMINATOR FOR MACHINE TOOL SLIDES
                    Filed Feb. 29, 1932        2 Sheets-Sheet 1

Inventor
WALTER D. ARCHEA

By  H. K. Parsons
           Attorney

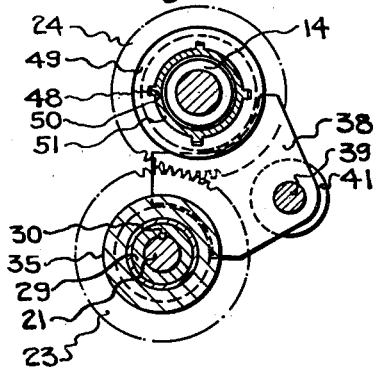
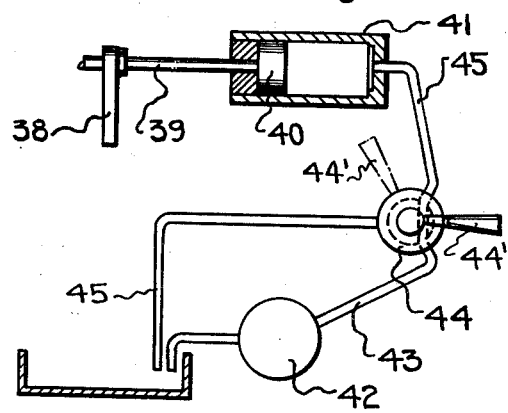
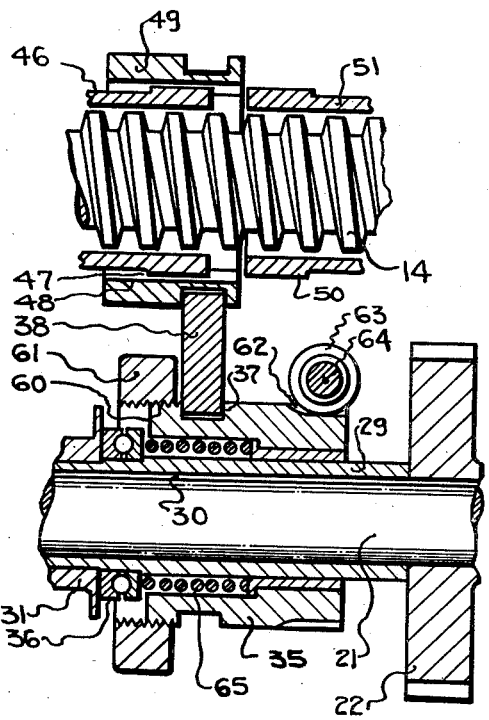

Patented June 5, 1934

UNITED STATES PATENT OFFICE 1,961,125

BACK LASH ELIMINATOR FOR MACHINE TOOL SLIDES

Walter D. Archea, Cincinnati, Ohio, assignor to The Cincinnati Milling Machine Company, Cincinnati, Ohio, a corporation of Ohio Application February 29, 1932, Serial No. 595,788

9 Claims. (Cl. 90—22)

This invention relates to machine tool slides and more particularly to an improved translating mechanism therefor.

It is well-known that in particular types of machine tools the cutting force bears such a directional relation to the feeding force that it is difficult to maintain a uniform feed of the work. This is especially true in milling machines set up for taking a hook-in cut, the tendency being for the cutting force to act as a feeding force thereby usurping the duty of the feed element. With the usual feeding mechanisms it is impossible to prevent this advancing action by the cutting force and a varying feed results which causes chatter or vibration in the work which is harmful both to the cutter and to the finish and accuracy of the work. The greatest danger, however, is at the beginning of the cut because the first tooth to engage the work acts to pull the work into the cutter rather than cut. The extent of this movement is equal to the amount of back lash in the driving mechanism and determines the size of the next chip to be removed. Due to this additional movement the size of the chip will be so large that the cutter will jam and damage will result.

It is therefore one of the objects of this invention to provide auxiliary means which will act in cooperation with the feeding means to anticipate the accelerating effect of the cutting force so that the rate of feed will be solely determined by the feeding element.

Another object of this invention is to prevent momentary acceleration or increase in the feed rate of a work support by a cutting force acting in the direction of support movement.

A further object of this invention is to eliminate wind-up in a lead screw of a translatable slide by the torsional feeding force thereby reducing the possibility of changes in lead screw length occurring during a machining operation which may vary or affect the accuracy thereof.

Other objects and advantages of the present invention should be readily apparent by reference to the following specification considered in conjunction with the accompanying drawings illustrative of one embodiment thereof but it will be understood that any modifications may be made in the specific structural details thereof within the scope of the appended claims without departing from or exceeding the spirit of the invention.

Referring to the drawings in which like reference numerals indicate like or similar parts:

Figure 3 is a view on the line 3—3 of Figure 2.

Figure 4 is a diagrammatic view of the hydraulic circuit controlling the coupling of the eliminator.

Figure 5 is a view showing a modified form of the invention.

Figure 1:
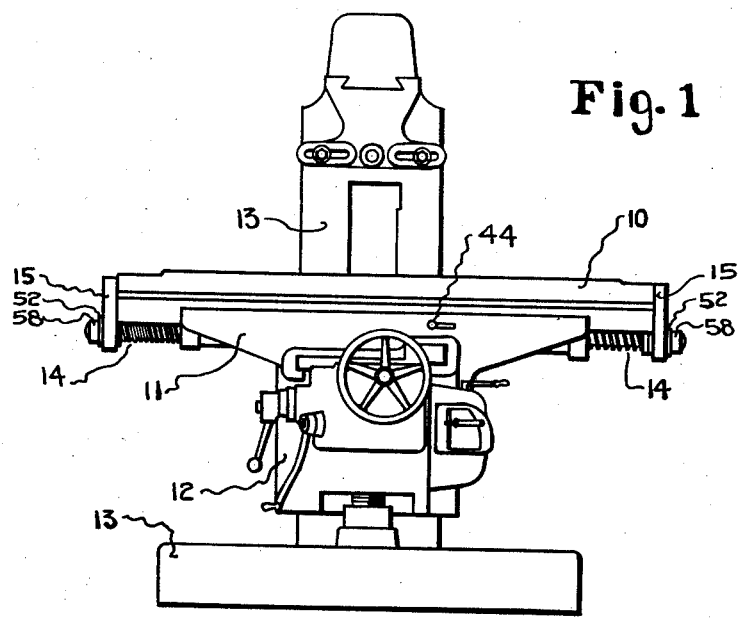
Figure 1 is a front elevation of a machine tool embodying the principles of this invention.

To best illustrate this invention, a milling machine such as shown in Figure 1 has been chosen, this machine having a movable work supporting slide 10 which is translatably mounted upon a support member 11 which may be in turn mounted upon an adjacent support 12 carried by the column 13 of the machine. Such machines usually have a feed screw 14 which is mounted at opposite ends in brackets 15 depending from the ends of the table or slide 10. The screw 14 usually extends through a rotatable nut journaled in the table support and adapted to be power rotated in opposite directions to effect a feeding movement of the table relative to the cutter. A rotating nut type of transmission is preferable from a transmission standpoint but difficulty has been experienced in providing suitable back lash eliminating means therefor.

Figure 2:
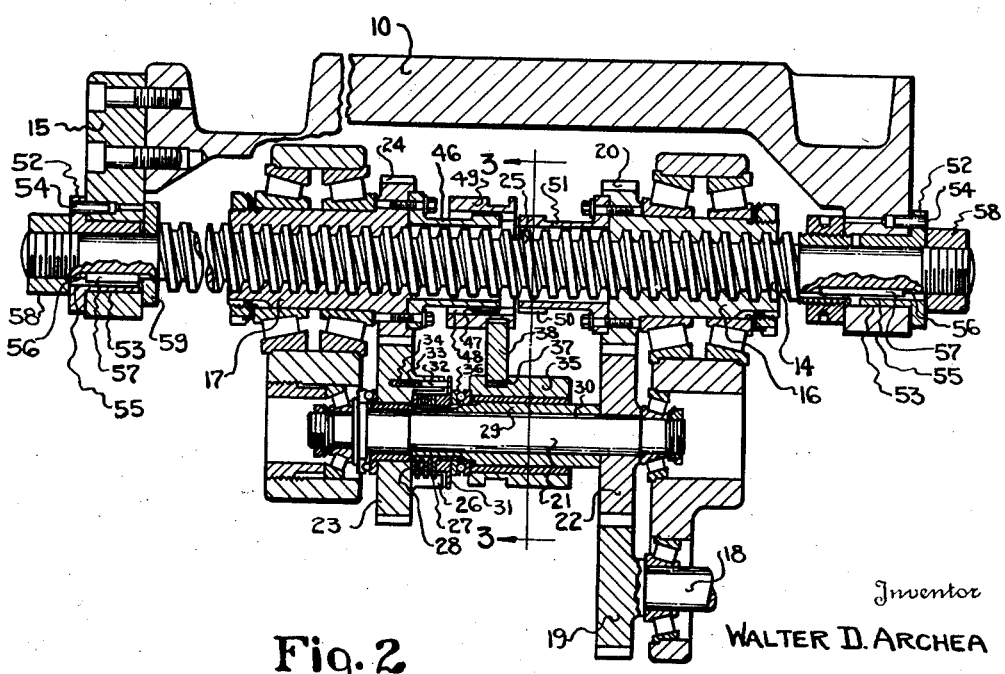
Figure 2 is an expanded view showing the application of the invention to a feed screw type of transmission.

This has been accomplished in the present invention by providing a pair of rotatable nuts such as 16 and 17 as shown in Figure 2 and so coupling these together that no difficulty is experienced therewith. Any type of conventional feed transmission may be utilized for actuating the slide and the reference numeral 18 illustrates the final shaft of such a transmission having a driving gear 19 fixed to the end thereof. This gear would ordinarily mesh with the gear 20 formed on the periphery of the nut 16 to effect rotation thereof and thereby translation of the table. In the present invention a shaft 21 has been interposed between these gears and carries at one end a gear 22 meshing with gears 19 and 20, the gear 22 having the same number of teeth and pitch as the gear 20. A one to one ratio therefore exists between the gears 20 and 22.

Another gear 23 is mounted for free rotation on the opposite end of the shaft 21 in mesh with a gear 24 formed on the periphery of the nut 17. A tooth differential exists between these gears however, the gear 23 having one or more teeth in excess of those on gear 24 whereby a full revolution of the gear 23 will effect a full revolution plus a slight fraction more in the gear 24. From this it will be seen that if the gear 23 is fixed to the shaft 21 that for each revolution of the shaft by the gear 19 the gear 20 will be rotated one complete revolution while each revolution of the gear 23 will impart a fraction more than one complete revolution to the gear 24. This means that the nut 17 will attempt to feed the screw at a faster rate than the nut 16. If this condition were permitted to exist, breakage of the parts would result.

Means have therefore been provided between the shaft 21 and the gear 23 to permit a certain amount of slippage to take place, the result being that the nut 17 will be acting on one side of the thread 25 tending to speed up the movement of the screw while the nut 16 will be acting upon the opposite side of the thread to retard this movement. Depending upon the hand of the screw and the direction of rotation of the nuts it will be seen that this construction will cause a constant tendency toward separation on the part of the two nuts or a constant tendency of movement toward one another, either condition of which will prevent a possibility of back lash between the screw and its power translating mechanism.

The connection between the shaft 21 and the gear 23 comprises the following mechanism: The gear 23 is provided with a laterally extending circumferential flange 26 in which a plurality of friction disks 27 are keyed for movement with the gear 23. Inserted between each of these disks are alternate friction disks 28 which are keyed to the sleeve 29 which is splined at 30 for rotation with the shaft 21, the spline also serving to couple gear 22 with the shaft. A collar 31 is axially, slidably mounted on the sleeve 29 in lateral engagement with the friction disks so that upon endwise movement of the collar, friction will be created between the disks to such an extent that the gear 23 will be rotated with the shaft 21.

The collar 31 is normally maintained in a disengaged position by a plurality of spring pressed plungers 32 which are slidably mounted in bores 33 formed in the flange 26 parallel to the axis of the gear and in which are also mounted springs 34 for maintaining the plungers in a normally projecting position. A second sleeve 35 is slidably mounted on the member 29 and an antifriction thrust bearing 36 is interposed between the end of the sleeve and the collar 31. An annular groove 37 is formed on the periphery of this sleeve in which is fitted a shifter fork 38 as shown on Figure 3. This shifter fork is mounted upon a piston rod 39 as shown in Figure 4 having a piston 40 secured to the end thereof and slidably mounted in an operating cylinder 41. Pressure therefore is supplied from a suitable pump 42 or other source of pressure either in the machine or outside from which it is conducted through channel 43 to the control valve 44 mounted at the front of the table support for convenient access thereto by the operator.

A channel 45 leads from this valve to the end of the cylinder 41 whereby upon the admission of pressure to the end of the cylinder the piston rod and shifter fork will be moved in an axial direction to force the member 31 into engagement with the friction disks to cause rotation of the gear 23 by the shaft 21.

The force of this friction may be varied by varying the amount of hydraulic pressure in the cylinder.

Upon movement of the handle 44' to the dotted line position shown in Figure 4, channel 45 will be connected to the return line 45' thereby permitting the springs 34 to return the parts. If the springs should not be sufficient, the cylinder 41 may be connected to the valve 44 for two way operation.

By this means it will be seen that the driving connection between the shaft 21 and the gear 23 is an impositive connection which permits slippage to take place. The driving force however is sufficient to cause the nut 17 to exert sufficient axial pressure on one side of the threads to move the screw and table and maintain metal to metal contact between the nut 16 and the opposite side of the threads of the screw and thus take up the lost motion before cutting starts.

Upon release of the hydraulic pressure it is apparent that the screw will be translated solely by the nut 16, because the nut 17 has stopped rotation, and therefore the transmission will comprise only the gears 19, 22 and 20. The difficulty with this is that the screw 14 is a non-rotating screw, and therefore rotation of the nut 16 will attempt to pull a stationary screw through a stationary nut 17. This would prevent axial movement of the screw and presents the difficulty which applicant has overcome in the present invention by providing means maintaining rotation between the nut 17 and the screw 14 without such rotating means acting in any sense as a back lash eliminator but on the other hand rotating in exact unison with the nut 16 so that the two rotate as a single nut.

This is accomplished by securing to the end of the nut 17 a member 46 having a series of projecting teeth 47 formed around its periphery engaging a series of grooves 48 formed on the interior bore of the slidable member 49. These teeth may be in the form of gear teeth or simply as a single key by which one is held for rotation with the other. It is preferable, however, that a plurality of evenly spaced teeth be provided as it facilitates meshing with similar teeth such as 50 which are formed on the periphery of a similar member 51 attached to the end of gear 20. These members 46 and 51 may be integral with the respective gears or they may be made detachable as shown in the drawings. If now the member 49 is moved axially to the right as viewed in Figure 2 to effect disconnection of the friction clutch 31 it will be seen that the two nuts 16 and 17 practically constitute a single nut member rotated by means of gears 20 and 22. Since they rotate practically together, there is no reaction between them in any manner that will compensate for back lash.

Since the disconnection of the friction clutch renders the device inoperable, it is desirable that disconnection between the members 46 and 51 be made immediately and therefore the collar 49 is coupled with the sleeve 35 by means of an additional fork formed on the member 38 so that immediately upon withdrawal of the member 35 to disconnect the friction clutch the sleeve 40 will be immediately moved into operative connection with the sleeve 51 to couple the two members 16 and 17 together for simultaneous rotation.

Another important feature of the invention which adds greatly to the stiffness of the structure and which prevents wind-up in the feed screw is shown in Figure 2 in which both ends of the screw are shown as keyed in their respective brackets 15 of the table. A bushing 52 is inserted in the bore 53 in the bracket and held against rotation relative thereto by one or more pins 54. The sleeve 52 is provided with a keyway 55 and the end of the screw provided with a key 57 fitting the keyway. A nut 58 is threaded on one end of the screw which in cooperation with a collar 59 prevents axial movement of the screw relative to the table. At the other end a nut 59' is threaded on the bushing to hold the same in place and a nut 58 threaded on the end of the screw to tension the same.

Attention is invited at this point to the importance of keying both ends of the screw against rotation relative to the table. If the screw were held against rotation as by means of a key in only one of the end brackets which is general practice, it will be seen that a turning moment applied at any point throughout the length of the screw will only be resisted by the torsional resistance existing in the screw between the point of application of the turning force and the end bracket in which the screw is keyed. This winding up of the screw has a tendency to shorten the same or in other words provide a certain resiliency therein which permits a certain amount of longitudinal vibration of the table relative to the point of the cutter and therefore an unevenness in the feed as well as inaccuracy in longitudinal positioning of the work with respect to the cutter.

In the present construction this resistance has been doubled by keying the screw against rotation with respect to both brackets so that a turning force applied centrally of the screw will be resisted not only by the torsional resistance of the screw between the point of force application and one end bracket, but in addition, by the torsional resistance of the cross section of the screw between the point of force application and the other bracket. Thus any turning force is resisted by twice the torsional forces ordinarily utilized and thus any elongation or shortening of the screw is divided throughout the length of the feed screw and applied to both sides of the work which equalizes the movement and does not have such an injurious effect.

A modified form of the invention is illustrated in Figure 5 in which if so desired, mechanical means may be utilized for effecting shifting of the sleeve 35 instead of the hydraulic means shown in Figure 2. In this case the sleeve 35 is provided with a peripheral thread 60 by which it is threaded in a fixed nut 61 carried by the table support. Also the periphery of the member 35 has pinion teeth 62 cut thereon which are engaged by a worm 63 keyed for rotation to the shaft 64 which may extend to the outside of the table support for manual rotation by the attendant. The operation of this device is that rotation of the worm 63 causes rotation of the member 35 which by means of the thread 60 causes axial movement to the left, as viewed in Figure 5, compressing spring 65 and causing engagement of the friction clutch. The member 49 may be connected to the member 35 in a similar manner by the clutch fork 38 for simultaneous movement therewith. Rotation of the shaft 64 in the opposite direction will cause withdrawal of the sleeve 35 and simultaneous coupling of the two members 17 and 16 for constant rotation.

There has thus been provided an improved means for translating a movable slide of a machine tool at a uniform feed rate irrespective of the external forces acting on the machine slide to accelerate or retard its movement, and in which the screw is so mounted that torsional resistance thereof is double the torsional resistance of present day structures. Furthermore a back lash eliminator has been provided for the transmissions of movable machine slides which may be easily and quickly connected or disconnected depending upon the direction of the external forces acting upon the slide.

What is claimed is:

1. In a machine tool having a support, a slide reciprocably mounted upon the support, means to actuate the slide comprising a lead screw fixed against rotation with the slide, a nut rotatably mounted in the support engaging said lead screw, a power driven shaft, and gearing coupling the shaft to the nut, the combination of means to prevent lost motion between the shaft and lead screw including a second rotatable nut engaging the lead screw, gearing of different ratio than the first gearing impositively connecting the second nut to the shaft whereby rotation of the shaft will tend to impart different rates of movement to the screw causing a reaction between the nuts and thereby elimination of lost motion.

2. In a machine tool having a support, a slide reciprocably mounted upon the support, the combination of means to actuate the slide without lost motion comprising a lead screw mounted in the slide and fixed therewith against rotation, rotatable means mounted in the support through which the screw is passed for effecting translation thereof including a pair of threaded members, a power shaft, differential gearing coupling the members to the shaft, positive means operatively connecting one of said members to the shaft, and impositive means connecting the other member to the shaft whereby upon rotation of the shaft a constant reaction will be set up tending to separate the members and thereby eliminate lost motion between the power shaft and the lead screw.

3. In a mechanism for effecting translation of a movable support without lost motion, the combination of a lead screw fixed to the support for movement therewith, means to hold the lead screw against rotation, means engaging said screw to effect axial movement thereof including a pair of internally threaded members journaled in the bed, a power shaft, different ratio gearing coupling the shaft to the members, positive means connecting the gearing having the smaller ratio to the drive shaft, impositive means connecting the gearing having the larger ratio to the drive shaft whereby one of said members will exert a constant advancing pressure on the lead screw and the other a constant retarding pressure.

4. In a milling machine having a movable slide, the combination of mechanism for imparting a constant feed to the slide including a lead screw secured to the slide against rotation, internally threaded means engaging said screw, a power shaft, means to positively couple the shaft with a portion of said threaded means, means to impositively connect the shaft with the remaining portion of said threaded means, the latter connection being of larger ratio than the former whereby upon rotation of the shaft slippage will take place in the impositive connection and a shiftable member for disconnecting the impositive drive and simultaneously connecting the portions of said threaded means for joint rotation.

5. A lost motion eliminator for machine tool slides having a non-rotatable lead screw comprising a pair of internally threaded members engaging said screw, a power shaft, differential gearing extending from the shaft to said members, the gearing to one of said members being positively connected to the shaft, a friction clutch connecting the other gearing to the shaft whereby upon rotation of the shaft slippage will take place as one member tends to advance the screw at a greater rate than the other member thereby maintaining a constant reaction between the members and eliminating lost motion between the shaft and lead screw, means to disconnect the friction clutch to render the eliminator inoperative including hydraulically actuated shifting means coupled to the clutch and a control valve for determining the admission of pressure thereto.

6. A lost motion eliminator for machine tool slides having a non-rotatable lead screw comprising a pair of internally threaded members engaging said screw, a power shaft, differential gearing extending from the shaft to said members, the gearing to one of said members being positively connected to the shaft, a friction clutch connecting the other gearing to the shaft whereby upon rotation of the shaft slippage will take place as one member tends to advance the screw at a greater rate than the other member thereby maintaining a constant reaction between the members and eliminating lost motion between the shaft and lead screw, means to disconnect the friction clutch to render the eliminator inoperative including hydraulically actuated shifting means coupled to the clutch, said means including a piston and cylinder, one of which is connected to the clutch, a source of pressure and a control valve for determining the coupling of pressure to said cylinder.

7. A lost motion eliminator for machine tool slides having a non-rotatable lead screw comprising a pair of internally threaded members engaging said screw, a power shaft, differential gearing extending from the shaft to said members, the gearing to one of said members being positively connected to the shaft, a friction clutch connecting the gearing of the other member to the shaft whereby upon rotation of the shaft slippage will take place as one member tends to advance the screw at a greater rate than the other member thereby eliminating lost motion between the shaft and the lead screw, means to disconnect the friction clutch to render the eliminator inoperative including shifting means coupled to the clutch, said means including a worm and worm gear, the worm gear being integral with the clutch member and fixed threaded means engaging the clutch member whereby upon rotation in one direction thereof it will be withdrawn from operative position.

8. In a milling machine having a work slide and a power shaft, the combination of means for connecting the shaft to the slide to effect a constant feed thereof including a lead screw fixed to the slide against rotation, a pair of internally threaded members engaging said screw, means to positively connect one of said members with the shaft for rotation thereby, means to impositively connect the other to said shaft, the latter connection being of larger speed ratio than the former, thereby tending to cause a greater advance in the lead screw causing slippage in the impositive connection, said connection comprising a friction clutch, means for maintaining frictional pressure in the clutch, means to vary said pressure including a rotatable member threaded in a fixed member, and worm and worm gear connection for effecting rotation thereof to adjust the pressure on the clutch and thereby the point of slippage thereof.

9. The combination with a machine tool slide having a lead screw fixed thereto, of a pair of internally threaded members engaging said lead screw, a power shaft, different speed ratio branch transmissions extending from the shaft to said members whereby one will tend to advance the lead screw ahead of the other, causing a retarding of one member, a frictional drive in the branch transmission to said retarded member permitting slippage relative to the power shaft, means to disconnect the frictional drive to stop rotation of the respective threaded member and means simultaneously operable to connect said member with the other threaded member for rotation therewith.

WALTER D. ARCHEA.